US009791305B2

(12) United States Patent
Heide et al.

(10) Patent No.: US 9,791,305 B2
(45) Date of Patent: Oct. 17, 2017

(54) APPARATUS FOR MEASURING A LIQUID FLOW

(71) Applicant: Fresenius Medical Care Deutschland GmbH, Bad Homburg (DE)

(72) Inventors: Alexander Heide, Eppstein (DE); Dejan Nikolic, Frankfurt am Main (DE)

(73) Assignee: FRESENIUS MEDICAL CARE DEUTSCHLAND GMBH, Bad Homburg (DE)

( * ) Notice: Subject to any disclaimer, the term of this patent is extended or adjusted under 35 U.S.C. 154(b) by 0 days.

(21) Appl. No.: 14/777,919

(22) PCT Filed: Mar. 28, 2014

(86) PCT No.: PCT/EP2014/056303
§ 371 (c)(1),
(2) Date: Sep. 17, 2015

(87) PCT Pub. No.: WO2014/166762
PCT Pub. Date: Oct. 16, 2014

(65) Prior Publication Data
US 2016/0290843 A1    Oct. 6, 2016

(30) Foreign Application Priority Data
Apr. 10, 2013  (DE) .......................... 10 2013 006 142

(51) Int. Cl.
*G01F 1/58*    (2006.01)
(52) U.S. Cl.
CPC .................................. *G01F 1/586* (2013.01)

(58) Field of Classification Search
CPC ..... G01F 1/58; G01F 1/56; G01F 15/00; G01F 1/80; G01F 1/00
USPC ............ 73/861.11–861.13, 861.352, 861.08, 73/861.77; 702/45
See application file for complete search history.

(56) References Cited

U.S. PATENT DOCUMENTS

| 3,177,383 | A | 4/1965 | Carlson, Jr. |
| 4,346,605 | A | 8/1982 | Skladzien et al. |
| 5,691,484 | A * | 11/1997 | Feller ...................... G01F 1/584 73/861.13 |
| 5,695,471 | A * | 12/1997 | Wampler .............. A61M 1/101 417/423.1 |
| 6,085,599 | A | 7/2000 | Feller |
| 6,581,476 | B1 * | 6/2003 | Fremerey .............. A61M 1/101 73/861.77 |
| 6,644,127 | B1 * | 11/2003 | Matzen ............... G01F 25/0007 73/861.12 |

(Continued)

FOREIGN PATENT DOCUMENTS

| DE | 1038769 | 9/1958 |
| DE | 3000965 | 7/1981 |

(Continued)

*Primary Examiner* — Jewel V Thompson
(74) *Attorney, Agent, or Firm* — Jacobson Holman, PLLC.

(57) ABSTRACT

An electromagnetic flowmeter for measuring a flow of liquid in a liquid-carrying line has a magnet for producing a magnetic field in the liquid-carrying line, and an electrode pair for discharging an electrical voltage when the liquid flows through the liquid-carrying line. The flowmeter enables the flow of liquid to be determined on the basis of the measured voltage. The magnet can rotate about an axis in order to produce an alternating magnetic field.

13 Claims, 3 Drawing Sheets

(56) References Cited

U.S. PATENT DOCUMENTS

| | | | | |
|---|---|---|---|---|
| 6,904,809 B1* | 6/2005 | Aundal | ............... | G01F 1/58 |
| | | | | 73/861.08 |
| 7,603,915 B2* | 10/2009 | Spivak | ............... | G01F 1/78 |
| | | | | 73/861.352 |
| 8,655,603 B2* | 2/2014 | Hieb | ............... | B67D 1/0029 |
| | | | | 702/100 |

FOREIGN PATENT DOCUMENTS

| | | |
|---|---|---|
| DE | 3329899 | 3/1985 |
| DE | 3700165 | 7/1988 |
| DE | 19616281 | 11/1996 |
| DE | 102004022518 | 12/2005 |
| DE | 102010003642 | 9/2011 |
| EP | 0762085 | 3/1997 |
| GB | 834011 | 5/1960 |
| JP | H02280012 | 11/1990 |
| JP | H09257538 | 10/1997 |

\* cited by examiner

APPARATUS FOR MEASURING A LIQUID FLOW

CROSS-REFERENCE TO RELATED APPLICATION

This application is a nationalization of PCT/EP2014/056303 filed Mar. 28, 2014.

BACKGROUND OF THE INVENTION

1. Field of Invention

The invention relates to a flowmeter for measuring a liquid flow in a liquid-carrying line as well as a combination of a liquid pump for creating a liquid flow in a liquid-carrying line and a flowmeter for measuring the liquid flow.

2. Description of the Prior Art

Magnetic flowmeters, which may also be referred to as electromagnetic flowmeters or inductive flowmeters, are based on measurement of the velocity of flow of a conductive liquid through a known or controlled magnetic field by measuring the induced electric voltage. With a known flow cross section, the flow rate or volume flow can be deduced from the velocity of flow, which should be covered by the concept of liquid flow in the following discussion. An electric voltage occurs in a magnetic field through which the flow passes due to a charge separation of the ions that are present in a conductive liquid and can be measured as an induced voltage. The voltage measurement is typically performed by tapping the induced voltage on a pair of electrodes that are in electrical contact with the conductive liquid. This voltage is proportional to the velocity of flow and is independent of the magnetic field strength. The charge separation takes place in a direction perpendicular to the direction of flow and to the direction of the magnetic field. The magnetic field of a magnetic flow meter is therefore preferably arranged perpendicular to the direction of flow in the corresponding liquid channel, and the electrode pair for diverting the induced electric voltage is preferably arranged perpendicular to both the magnetic field and the direction of flow in the liquid channel.

A typical electromagnetic flowmeter is constructed from a non-magnetic and non-magnetizable tube lined on the inside with electrically insulating material.

The magnetic field is typically generated by one or more coils arranged outside of the tube through which the liquid flows. The electric voltage induced by the liquid flow is typically determined by a voltmeter, and the result of the voltage measurement is sent to an evaluation unit for determining the liquid flow, i.e., the flow rate or the volume flow based on the measured voltage.

The electric voltage tapped at the electrodes is frequently additionally influenced or disturbed by electrochemical potentials. To compensate for the influences or disturbances caused by the electrochemical potentials or to correct for them in the calculations, typically an a.c. field or an alternating field is used as the magnetic field in an electromagnetic flowmeter. The use of permanent magnets in such a configuration is therefore normally ruled out.

The object of the present invention is therefore to provide an alternative electromagnetic flowmeter.

SUMMARY OF THE INVENTION

This object is achieved by an electromagnetic flowmeter as described herein, as well as a combination of an electromagnetic flowmeter and a liquid pump, as also described herein.

In accordance with the present invention, an electromagnetic flowmeter for measuring a liquid flow, in particular a velocity of flow or a volume flow in a liquid-carrying line is provided. The electromagnetic flowmeter has a magnet for generating a magnetic field in the liquid-carrying line as well as a pair of electrodes for tapping an electric voltage in the liquid-carrying line when the liquid is flowing through the liquid-carrying line, to determine the liquid flow based on the measured voltage. The magnet can be rotated about an axis to generate an alternating magnetic field. The alternating magnetic field may have a sinusoidal curve or some other alternating curve.

The rotatable magnet is preferably embodied as a permanent magnet. The rotatable magnet may also be embodied as an electromagnet, or in other words, as a magnetizable coil, wherein the magnet property occurs only during operation when a suitable energizer current flows through the electromagnet.

In a preferred embodiment, the electromagnetic flowmeter comprises a voltmeter for measuring the electric voltage between the electrodes of the electrode pair and an evaluation unit for determining the liquid flow in the liquid-carrying line based on the measured electric voltage.

In another preferred embodiment of the electromagnetic flowmeter, the evaluation unit has means for determining the phase relation of an interference component of the measured electric voltage, means for determining a signal freed of the interfering component, based on the measured voltage and the phase relation of the interference component as well as means for determining the liquid flow on the basis of the signal freed of the interference component. The inventors have recognized that an electric voltage that is induced by the alternating magnetic field and is proportional to the change in the magnetic field can, as an interference component, be eliminated from the measured voltage in this way to thereby generate a signal that has been freed of interference. This interference-free signal can then be used further to determine the liquid flow.

The inventors have also recognized that the phase relation of the interference component can be determined by determining the phase relation of the angle of rotation of the rotatable magnet.

The phase relation of the rotatable magnet is advantageously determined using a Hall sensor or using an optical angle of rotation sensor.

The electromagnetic flowmeter is preferably embodied jointly with a liquid pump for circulating liquid in the liquid-carrying line, wherein the pump has a pump rotor connected to the rotatable magnet. This permits a particularly compact embodiment of the electromagnetic flowmeter and the liquid pump. Rotatable parts that are present inside the pump anyway can thus be utilized for an additional function.

In a preferred embodiment, the liquid pump is an impeller pump and the pump rotor is the impeller of the impeller pump.

In a preferred embodiment the liquid pump is a peristaltic pump and the pump rotor is the pump head of the peristaltic pump.

The liquid pump preferably has an electric motor as the drive, wherein the electric motor comprises a stator for generating a magnetic rotational field and a rotatable rotor that is situated in the rotating field and wherein the rotor comprises the rotatable magnet. The rotatable magnet may thus be a rotatable magnetizable coil when a current is induced in the rotor only during operation and then magnetizes the magnet.

In a preferred embodiment, the electric motor is a synchronous motor, in particular a synchronous motor having a permanent magnet as the rotor. This is a particularly simple embodiment of the rotor.

In another preferred embodiment, the pump rotor is connected to a first magnetic coupling half of a magnetic coupling for coupling the first coupling half to a second coupling half of the magnetic coupling connected to a drive so that the drive can drive the liquid pump via the magnetic coupling when the first and second halves of the coupling are magnetically coupled, and wherein the coupling half then comprises the rotatable magnet. Thus, parts present in a magnetic coupling anyway can be used advantageously for an additional purpose.

DETAILED DESCRIPTION OF THE PRFERRED EMBODIMENTS

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Figure 1:
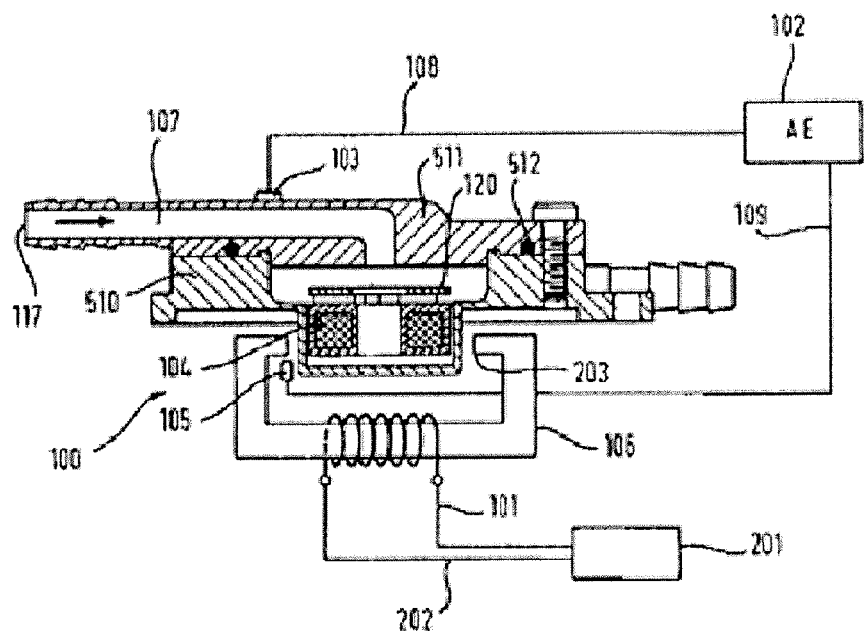
FIG. 1 shows a cross section through a flowmeter and a liquid pump in accordance with the disclosed teaching.

FIG. 1 shows a cross section through a liquid pump 100 having a flowmeter integrated into it in accordance with the disclosed teaching. The liquid pump 100 has a liquid inlet 117 for the electrically conductive liquid to be pumped. In the embodiment illustrated here, the pump 100 comprises an upper pump half 511 and a lower pump half 510, which are sealed with respect to one another by a sealing ring 512. The liquid to be pumped is circulated through a pump rotor 120, embodied by the impeller 120 in the present embodiment of the liquid pump 100 as an impeller pump. When the impeller 120 is set in rotation, as will be described further below, a pressure difference develops in the liquid to be pumped between the liquid inlet 117 and a liquid outlet (not shown), which pumps the liquid in a liquid circulation (not shown) that is connected when its flow resistance is low enough. However, the teaching according to the disclosure can also be applied in the case of a peristaltic pump as a liquid pump, wherein the function of the impeller as a pump rotor would then also be embodied by the pump head of the peristaltic pump as a pump rotor. The impeller 120 is fixedly connected to a magnet 104, which is preferably embodied in a rotationally symmetrical form, driving the impeller 120. The magnet 104 is preferably embodied as a permanent magnet, but alternative embodiments are also possible, in which the magnet 104 is embodied as a magnetizable coil, generating a coil current only during operation and then inducing the magnetic property, to drive the impeller. The magnet 104 is rotationally mounted by a magnetic cushion, for example, as a bearing.

The magnet 104 is situated in a rotary magnetic field generated by a stator, whose one energizer coil is shown with an iron core 106 with legs 203 and with terminals 101 for applying an alternating voltage. On the whole, two or more, preferably three energizer coils are present, an alternating current being applied to them with a phase shift to thereby generate a rotary magnetic field between the legs 203. These energizer coils together form the stator of an electric motor. The terminals 101 for applying an alternating voltage are connected to an alternating voltage source 201 that is preferably connected by electric lines 202 for supplying the two or more phase-shifted alternating voltages. Control of the alternating voltages supplied by the alternating voltage source 201 comprises control of the frequency and thus control of the frequency of the rotary field.

The rotationally supported magnet 104 forms the rotor of an electric motor, namely the rotor of a synchronous motor in a preferred embodiment. In this case, the rotational speed of the electric motor and thus the rotational speed of the liquid pump can be controlled by control of the frequency of the rotary magnetic field.

The rotationally supported magnet 104 is surrounded by a magnetic field, whose magnetic field lines pass through a liquid line 107 situated downstream from the liquid inlet 117. An electrode pair 103 is situated on the inside of the liquid line 107. The electrodes of the electrode pair 103 may be galvanically coupled to the liquid in the liquid line 107, or a capacitive coupling may be provided. The connecting line between the electrodes of the electrode pair 103 is preferably essentially perpendicular to the direction of flow in the liquid line 107 and also perpendicular to the field lines of the magnetic field surrounding the magnet 104. In an alternative embodiment, a plurality of electrode pairs may also be used, for example, to enable a measurement in a plurality of locations in the liquid line or to make available an electrode pair at a location through which no liquid flows as a reference electrode pair. An electrode pair may be provided with a grounding electrode which constitutes a ground potential. A common grounding electrode may be provided for a plurality of electrode pairs.

If an electrically conductive liquid is flowing through the liquid line 107, then because of the magnetic field surrounding the magnet 104, a charge separation develops and can be tapped as the induced voltage at the electrode pair. The measured voltage tapped at the electrode pair is sent to the evaluation unit 102 by way of a measurement line 108.

The magnetic field surrounding the magnet 104 is an alternating field due to the rotational movement of the magnet 104.

Therefore, an additional induced voltage, which occurs when the branches of the measurement line 108 together with the electrode pair 103 form a loop, or in other words, form a circuit in the alternating field surrounding the magnet 104, is superimposed on an additional induced voltage.

The voltage induced by the alternating magnetic field is proportional to the change in the magnetic flux through the circuit or the loop and therefore is proportional to the change in the magnetic field permeating the circuit or the loop. The interference component of the measuring voltage is proportional to the change in the magnetic field.

However, the voltage induced by the liquid flow and measured between the electrodes, in other words, the useful components of this voltage are proportional to the magnetic field prevailing between the electrodes.

In the case of a rotational movement of the magnet 104, the useful component and the interference component of the measurement signal are thus phase-shifted by approximately 90 degrees, wherein the exact angle of the phase shift depends on the geometry of the electrodes and the measurement line 108 for tapping the measurement voltage.

In accordance with the present disclosure, a phase signal that indicates the phase relation of the magnet 104 and thus the phase relation of the magnetic field surrounding the magnet is used to generate a signal which has been freed of interference components and can then be used to determine the liquid flow, in particular for determining the velocity of flow.

To determine the phase relation of the magnet 104, a rotational angle sensor 105 is provided, this sensor being connected to the evaluation unit 102 by a measurement line 109. The angle of rotation sensor is preferably embodied as a Hall sensor 109 for determining the phase relation of the magnetic field surrounding the magnet 104 and, based on that, the phase relation or the angle of rotation of the magnet 104. An alternative embodiment of the angle of rotation sensor 109 is an embodiment as an optical angle of rotation sensor wherein approximately a strip pattern connected to the rotatable magnet 104 is evaluated optically. Another embodiment of the angle of rotation sensor 105 comprises the use of coils for determining the angle of rotation.

Figure 2:
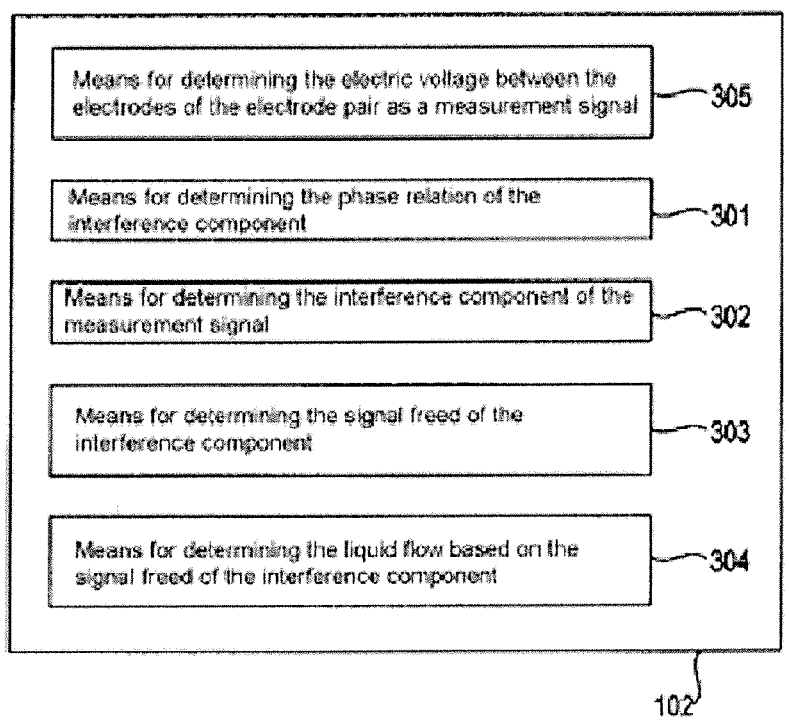
FIG. 2 shows a block diagram of the evaluation unit illustrated in FIG. 1.

One embodiment of the evaluation unit 102 for generating a signal that has been freed of interference components is described in greater detail in conjunction with FIG. 2.

The evaluation unit comprises a voltmeter connected to the measurement line 108, or in other words, means 305 for determining the electric voltage between the electrodes of the electrode pair 103 as a measurement signal.

The evaluation unit 102 additionally comprises means for determining the phase relation of the interference component 301. To do so, approximately one evaluation unit may be provided for analyzing the angle of rotation signal from the angle of rotation sensor 109 received via the signal line 109.

If the angle between the phase relation of the rotatable magnet 104 and the phase relation of the interference component is known, then the phase relation of the interference component can be deduced from the phase relation of the rotary magnet 104. To do so, a calibration measurement may be performed, measuring, for example, a measurement voltage, when it is certain that no fluid can flow through the fluid line 117, for example, since the fluid inlet 117 is cut off. In this case, the phase relation of the measurement signal corresponds to the phase relation of the interference component.

In addition, the evaluation unit 102 comprises means for determining a signal 303 that has been freed of the interference component; in other words, for determining the useful component of the measurement signal. To do so, the effective signal can be modeled as a periodic sinusoidal signal, where the phase relation of the useful signal is offset by 90 degrees from the phase relation of the interference component. The useful signal here is derived directly from a knowledge of its frequency and its phase as the corresponding phase component of the useful signal. Thus, for example, the useful signal can be obtained by phase-selected rectification of the measurement signal and then integration over a half-wave, where the half-wave in which the useful signal has a positive sign is chosen, i.e., is selected, and is then integrated by means of the half-wave. A corresponding method is described in chapter 5.3: Flow Measurement in an Alternating Field in "Strömungs—und Durchflussmesstechnik" [Flow and Measurement Technology," Otto Fiedler, Oldenburg Verlag Munich 1992, the disclosure content of which is herewith fully included in the present patent application. The useful signal is advantageously averaged over several half-waves.

In an alternative embodiment, the evaluation unit 102 additionally comprises means for determining the interference component of the measurement signal 302. To do so, the interference component can be modeled as a periodic sinusoidal signal. If the frequency and phase relation of the interference component are known, as described above, then its interference component can be determined directly from the measurement signal.

The evaluation unit also comprises means for determining the liquid flow 304, in particular the velocity of flow or the flow rate, based on the signal freed of the interference component. To do so, the signal that has been freed of the interference component may be subjected to an additional signal processing, for example, to take into account or to compensate for any additional interference effects caused by electrochemical potentials on the electrodes. To do so, for example, the positive and negative amplitudes of the useful signal can be compared with one another.

Figure 3:
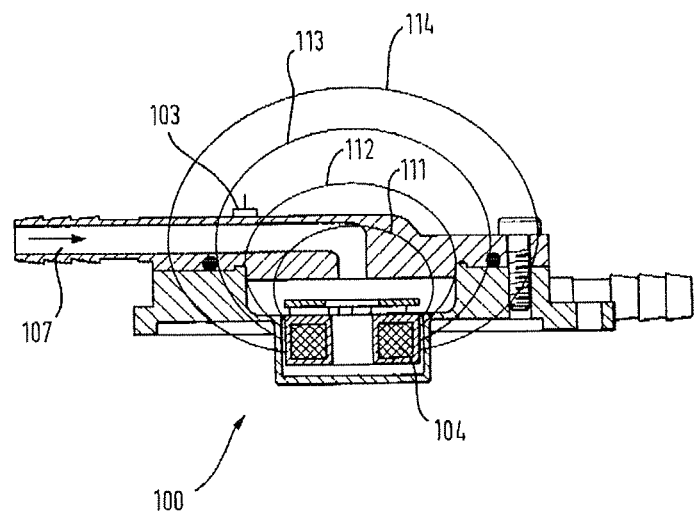
FIG. 3 shows a detail of the diagram from FIG. 1 together with a diagram of the magnetic field generated.

FIG. 3 shows a diagram of the top half of the liquid pump 100 described in conjunction with FIG. 1, with the liquid line 107, the rotationally mounted magnet 104, and the electrode pair 103, reference herewith being made to the description thereof instead of repeating it here.

In the diagram in FIG. 2, the connecting line between the electrodes of the electrode pair lies perpendicular to the plane of the drawing. The diagram in FIG. 3 additionally shows magnetic lines 111, 112, 113 and 114 of the magnetic field surrounding the rotationally mounted magnet 104. The magnetic field lines shown in the diagram correspond to a position of the rotatable magnet 104 in which a line connecting the poles of the magnet 104 runs in the horizontal direction in the plane of the drawing.

FIG. 3 shows that the magnetic field lines lie approximately at a right angle to the direction of flow in the liquid line 107 in the region of the electrode pair 103. In addition, it can be seen that an imaginary line connecting the electrodes of the electrode pair 103 runs approximately perpendicular both to the direction of flow in the liquid line 107 and also to the magnetic field lines of the magnetic field of the magnet 104.

Figure 4:
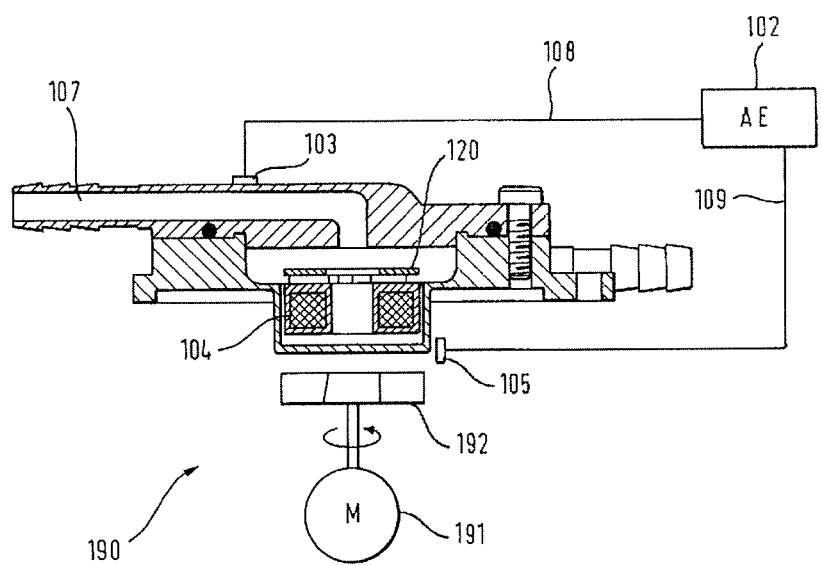
FIG. 4 shows a cross section through an additional liquid pump having a flowmeter in accordance with the disclosed teaching.

FIG. 4 shows another embodiment of a liquid pump with a flowmeter in accordance with the disclosed teaching. The top part of the liquid pump 190 corresponds essentially to the arrangement of the liquid pump 100 described in conjunction with FIG. 1. The same reference numerals denote the same or corresponding elements of the liquid pump, reference herewith being made to the description thereof instead of repeating it here. The essential difference from the arrangement described in conjunction with FIG. 1 is that a permanent magnet, which forms a magnetic coupling half 192 is provided in the liquid pump 190 to generate a rotating field, which is coupled to the rotating magnet 104. The permanent magnet 192 and the magnet 104 thus form a first and a second half of a magnetic coupling. The drive of the magnetic coupling is accomplished by an electric motor 191, which is illustrated schematically.

Figure 5:
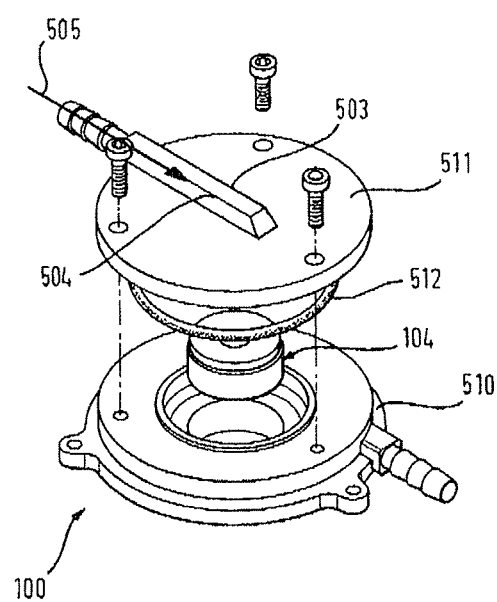
FIG. 5 shows an exploded diagram of the flowmeter and the liquid pump from FIG. 1.

FIG. 5 shows an exploded diagram of the flowmeter and the liquid pump 100 described in conjunction with FIG. 1. The liquid pump has a top pump half 511, in which the liquid line 107 shown in FIG. 1 is formed. A chamber is formed in a bottom pump half 510, accommodating the rotatable magnet 104 during operation. The top pump half 511 and the bottom pump half 510 are sealed with respect to one another by the sealing ring 512 during operation. In addition, connections 503 and 504 are shown for tapping a measured voltage from the electrodes of the electrode pair 103 mounted on the bottom side of the top pump half 511. Reference numeral 505 indicates the direction of flow in the liquid line 107, which is preferably essentially perpendicular to an imaginary line connecting the electrodes of the electrode pair 103.

The invention being thus described, it will be apparent that the same may be varied in many ways. Such variations are not to be regarded as a departure from the spirit and the scope of the invention, and all such modifications as would be recognized by one skilled in the art are intended to be included within the scope of the following claims.

What is claimed is:

1. An electromagnetic flowmeter for measuring a liquid flow in a liquid-carrying line, said flowmeter comprising:
   a magnet for generating a magnetic field in the liquid-carrying line;
   an electrode pair for tapping an electric voltage when the liquid flows through the liquid-carrying line, for determining the liquid flow based on the measured voltage, with the magnet being rotatable about an axis to generate an alternating magnetic field;
   an element for determining a phase relation of an interference component of the measured electric voltage;
   an element for determining a signal that has been freed of the interference component, based on the measured voltage; and
   an element for determining the liquid flow, based on the signal that has been freed of the interference component.

2. The electromagnetic flowmeter according to claim 1, wherein the rotatable magnet is a permanent magnet.

3. The electromagnetic flowmeter according to claim 1, wherein the rotatable magnet includes a magnetizable coil.

4. The electromagnetic flowmeter according to claim 1, further comprising a voltmeter for measuring the electric voltage between the electrodes of the electrode pair and an evaluation unit for determining the liquid flow in the liquid-carrying line, based on the electric voltage determined.

5. The electromagnetic flowmeter according to claim 1, wherein the element for determining the phase relation includes an element for determining an angle of rotation of the rotatable magnet.

6. The electromagnetic flowmeter according to claim 5, wherein the element for determining the angle of rotation includes a Hall sensor.

7. The electromagnetic flowmeter according to claim 5, wherein the element for determining the angle of rotation includes an optical angle of rotation sensor.

8. An assembly comprising:
   an electromagnetic flowmeter for measuring a liquid flow in a liquid-carrying line; and
   a liquid pump for circulating a liquid in the liquid-carrying line,
   the electromagnetic flowmeter including
      a magnet for generating a magnetic field in the liquid-carrying line,
      an electrode pair for tanning can electric voltage when t to liquid flows through the liquid-carrying line, for determining the liquid flow based on the measured voltage, with the magnet being rotatable about an axis to generate an alternating magnetic field,
      an element for determining a phase relation of an interference component of the measured electric voltage,
      an element for determining a signal that has been freed of the interference component, based on the measured voltage, and
      an element for determining the liquid flow, based on the signal that has been freed of the interference component, and
   the liquid pump including a pump rotor connected to the rotatable magnet or to a rotatable magnetizable coil.

9. The assembly according to claim 8, wherein the liquid pump is an impeller pump, and the pump rotor is an impeller of the impeller pump.

10. The assembly according to claim 8, wherein the liquid pump is a peristaltic pump, and the pump rotor is a pump head of the peristaltic pump.

11. The assembly according to claim 8, further comprising an electric motor for driving the liquid pump, wherein the electric motor includes a stator for generating a rotating magnetic field and a rotatable rotor situated in the rotating field, and wherein the rotor includes the rotatable magnet.

12. The assembly according to claim 11, wherein the electric motor is a synchronous motor.

13. An assembly comprising:
   an electromagnetic flowmeter for measuring a liquid flow in a liquid-carrying line; and
   a liquid pump, for circulating a liquid in the liquid-carrying line, the liquid pump including a pump rotor,
   the electromagnetic flowmeter including
      a magnet for generation a magnetic field in the liquid-carrying line,
      an electrode pair for tapping an electric voltage when the liquid flows through the liquid-carrying line, for determining the liquid flow based on the measured voltage, with the magnet being rotatable about an axis to generate an alternating magnetic field, and
      a first magnetic coupling half connected to the pump rotor, of a magnetic coupling for coupling the first coupling half to a second coupling half of the magnetic coupling connected to a drive that drives the liquid pump via the magnetic coupling, with the first coupling half including the rotatable magnet, and
   the pump rotor being connected to the rotatable magnet or to a rotatable magnetizable coil.

* * * * *